June 26, 1923.

J. K. DELANO

GEAR DRIVE

Filed Aug. 1, 1922

Inventor.
James K. Delano
By his Attorney
John J. Thompson

June 26, 1923.

J. K. DELANO

GEAR DRIVE

Filed Aug. 1, 1922

Inventor
James K. Delano
By his Attorney

Patented June 26, 1923.

1,459,948

UNITED STATES PATENT OFFICE.

JAMES KENDALL DELANO, OF YONKERS, NEW YORK.

GEAR DRIVE.

Application filed August 1, 1922. Serial No. 579,040.

*To all whom it may concern:*

Be it known that I, JAMES K. DELANO, a citizen of the United States, residing at 1947 Broadway, in the city of Yonkers, in the county of Westchester and State of New York, have invented certain new and useful Improvements in Gear Drives, of which the following is a specification, reference being had therein to the accompanying drawing.

This invention relates to a universal gear drive, in which either the driving or driven gear or both of them may be out of center with respect to the outside diameter of the gear without effecting the true center in any way, or effecting the proper meshing or running of the gears.

While the invention is intended more particularly for use with timing gears used in automobile ignition devices where the same are operated from the cam shaft of the engine, it is fully understood that this device may be applied to many uses where one of the shafts upon which the gears are mounted does not run true.

In driving certain types of automobile ignition devices from the cam shaft of the engine, the ignition device is mounted upon the gear cover or front plate of the engine through which the end of the cam shaft extends and in certain cases the cam shaft does not run true or concentric with the hole in the cover and as the ignition device with its driving gears is located concentric with the hole in the cover, it will be seen that if the driving gear was mounted directly upon the end of the cam shaft that said shaft not rotating in the same concentric center as the gear and hole in the gear cover would cause the gears to run out, thus preventing the gears from properly meshing and causing the ignition timing gears to quickly wear out and not to operate in a proper manner.

The object of the invention is to provide means whereby a universal gear driving means is provided whereby the eccentricity or wobble of the driving shaft is compensated for and the gears are driven in a smooth and efficient manner.

Also any end motion or thrust of the driving shaft does not effect the meshing of the gears, as the driving means forms a sliding connection with the drive gear, thus allowing the gears to run without end thrust.

With these and other objects in view, my invention consists in certain new and useful improvements which will be fully described and claimed in the annexed specification and claimed and illustrated in the accompanying drawings which form a part of this application and in which like figures of reference refer to corresponding parts in all of the views, and it is fully understood that slight changes may be made without departing from the spirit of the invention.

In the drawings

Figures 1, 2:
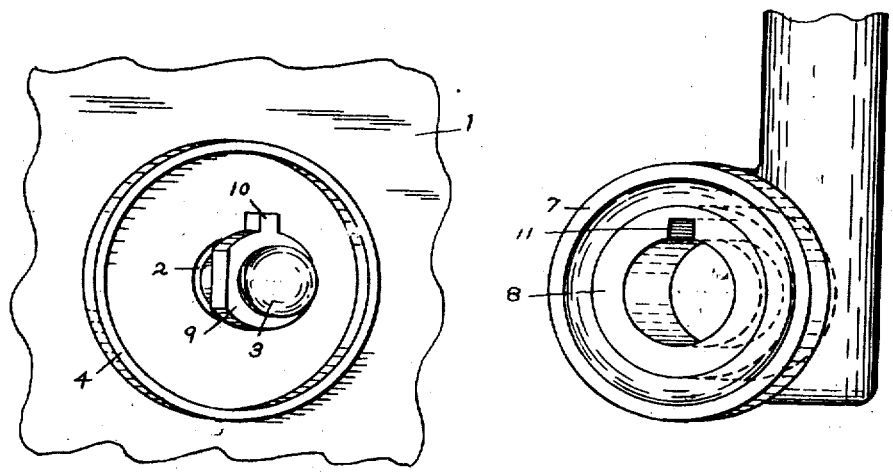
Figure 1 is a partial view of the gear cover or front plate of the automobile engine, showing the end of the cam shaft protruding therefrom and having the driving nut secured thereon.
Figure 2 is a rear view of the ignition housing showing the drive gear mounted therein and in position to be mounted upon and attached to the gear cover.
Figure 3:
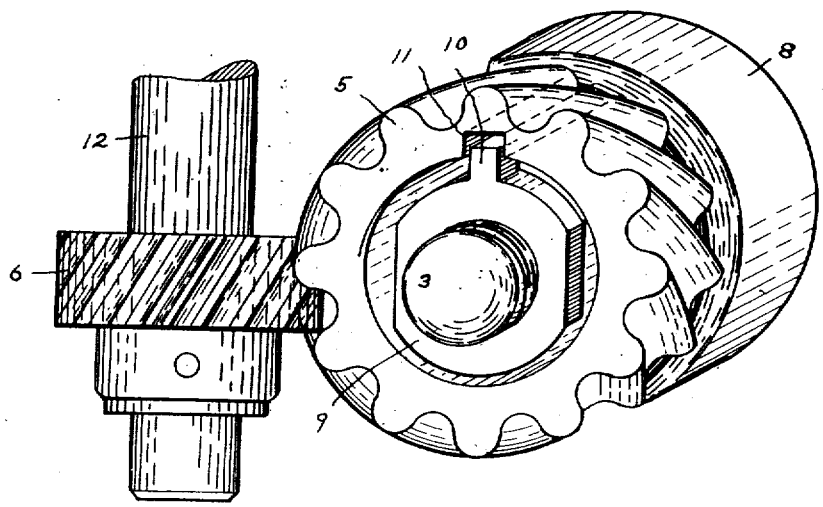
Figure 3 is a front view of the gears with the housing removed to show the gears in mesh and the driving nut in its assembled position.
Figure 4:
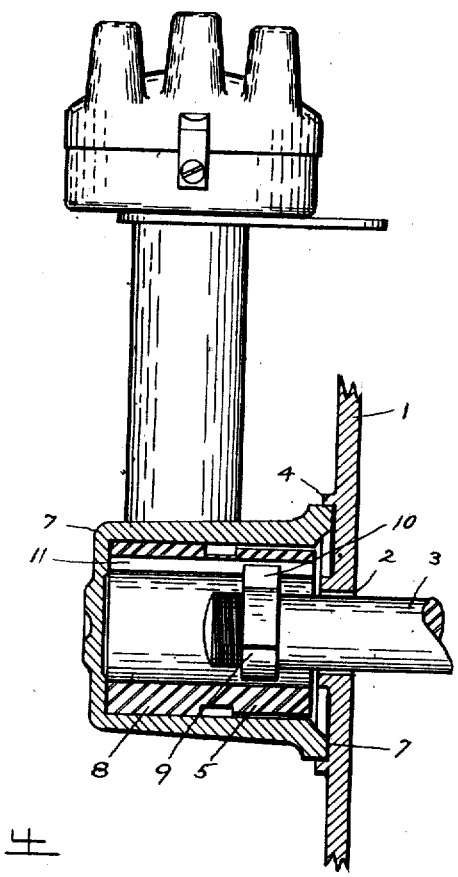
Figure 4 is a vertical sectional view of the cover and gear housing, showing the detail construction of the same and the manner in which the drive gear can slide upon the shaft.

Referring to the drawings, the numeral 1, indicates a portion of the usual front engine plate or gear cover, which forms a part of the engine, and which is formed with the hole 2 through which the end of the cam shaft 3 extends for the purpose of operating the ignition or timing devices.

Said gear cover 1, is further provided with a raised circular portion or ring 4 concentric with the hole 2 and designed for the purpose of locating and retaining the timing or ignition means, which it is intended to operate by the cam shaft, but it is found in practice that in some cases the cam shaft does not rotate true or concentric with the circular ring 4 and as one of the ignition gears 5 has to be mounted on or driven by the cam shaft 3 while the other or driven gear 6 is mounted in the ignition housing 7, if the gear 5 were mounted directly on the shaft 3 and said shaft 3 were out of center with relation to the ring 4 which locates the housing 7 carrying the gear 6, these gears will not mesh in proper manner and so the device can not be operated in a satisfactory manner.

To overcome this objection, I have provided the gear 5 with a large hub 8 of a diameter slightly larger than the outside diameter of the teeth of said gear, which is adapted to act as a bearing for said gear in the housing 7 to guide the rotation of said gear; and the rear of the housing 7 is turned to fit the inside of the ring 4, the housing 7 being clamped in place to the gear cover 1 in any suitable manner.

Upon the end of the cam shaft 3 is threaded or otherwise secured a driving nut 9 which is formed with a lug 10 adapted to extend into a keyway 11 formed in the gear 5 and of slightly larger dimensions than the lug 10 so that the lug 10 will drive the gear 5 and it may at all times have free movement in all directions to compensate for the eccentricity of the shaft 3 and thus form a universal gear drive for the gear 6 which rotates the ignition shaft 12.

Also it will be noted that the shaft 3 carrying the driving nut 9 may freely slide lengthwise within the gear 5, thus allowing said shaft 3 to have end movement or thrust without producing thrust on the gears.

It is fully understood that any type of gearing may be employed, such as, spur, bevel, etc.

Having thus described my invention, what I claim as new and desire to secure by Letters Patent is—

In a universal drive for gearing, in combination with a gear cover formed with a locating boss and a concentric hole, and a drive shaft extending through said cover and eccentric with said boss, of a gear housing on said cover and provided with a bearing concentric with said boss, a gear rotatably mounted in said bearing and formed with a bore and keyway therein, a drive nut adapted to be secured upon the end of the shaft and of less diameter than the diameter of the bore of said gear, a lug formed on said nut of less width than the width of said keyway, said lug adapted to engage said keyway and drive said gear, and having a limited free movement within said gear and said keyway to compensate for the eccentricity of said shaft with respect to said gear.

In testimony whereof I hereunto affix my signature.

JAMES KENDALL DELANO.